(Model.)

B. F. CARLON.
TIRE TIGHTENER.

No. 248,139. Patented Oct. 11, 1881.

WITNESSES:
C. Neveux
C. Sedgwick

INVENTOR:
B. F. Carlon
BY Munn & Co.
ATTORNEYS.

UNITED STATES PATENT OFFICE.

BENJAMIN F. CARLON, OF RED OAK, IOWA.

TIRE-TIGHTENER.

SPECIFICATION forming part of Letters Patent No. 248,139, dated October 11, 1881.

Application filed July 20, 1881. (Model.)

*To all whom it may concern:*

Be it known that I, BENJAMIN FRANKLIN CARLON, of Red Oak, in the county of Montgomery and State of Iowa, have invented a new and Improved Tire-Tightener, of which the following is a specification.

The object of my invention is to provide a new and improved device for expanding the felly of a wheel to fill the tire completely, and thus unite the felly and the tire very firmly.

The invention consists of two arms with jaws and binding-screws at the outer ends to receive and hold the felly, which arms are pivoted to a forked swivel-head loosely mounted in the top of a capstan-head of a screw fitting into a threaded aperture of a base resting against the hub of the wheel, so that the felly can be expanded by turning the capstan-head of the screw.

Figure 1:
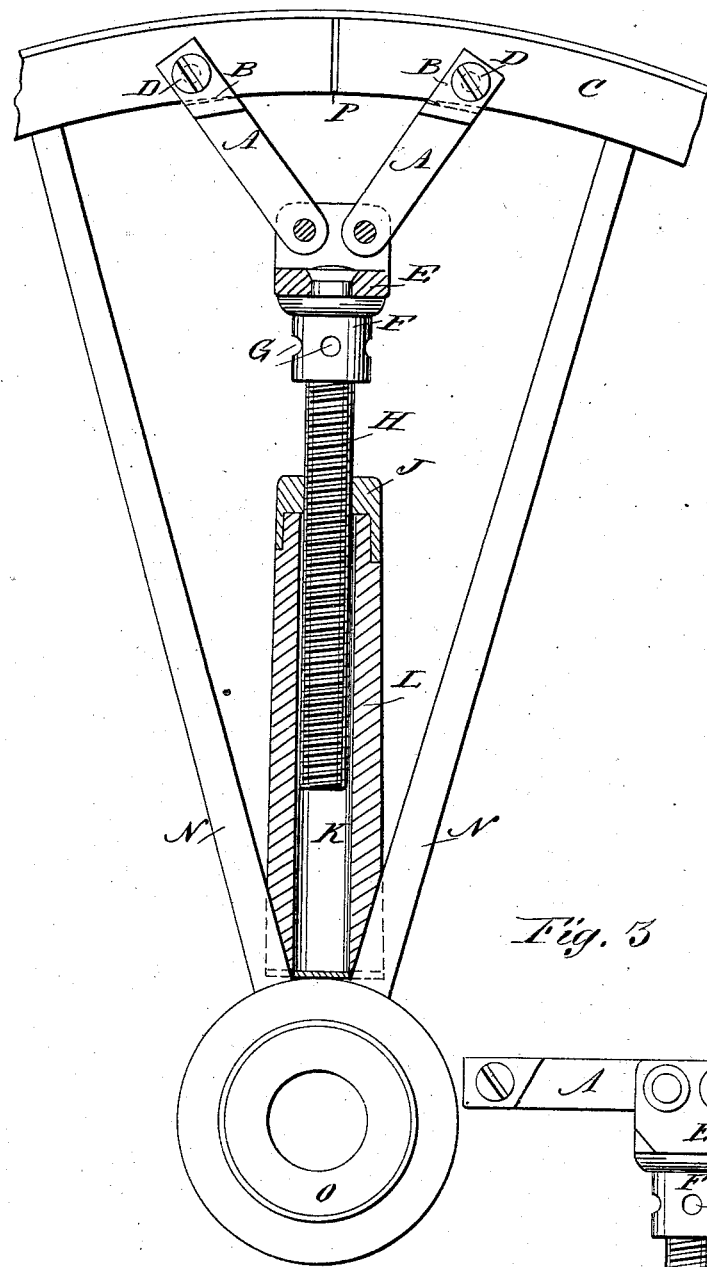
Figure 2:
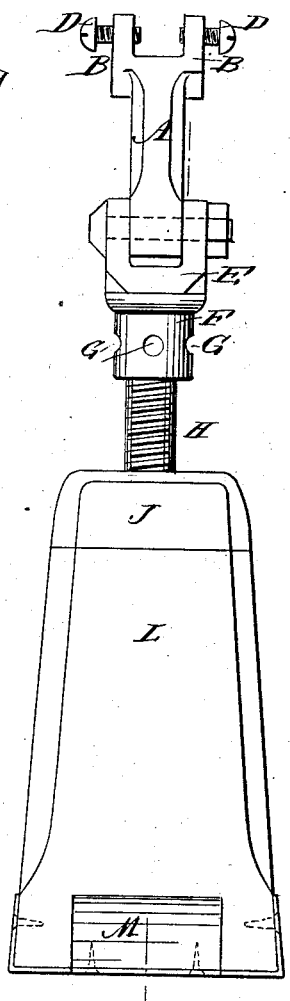
Figure 3:
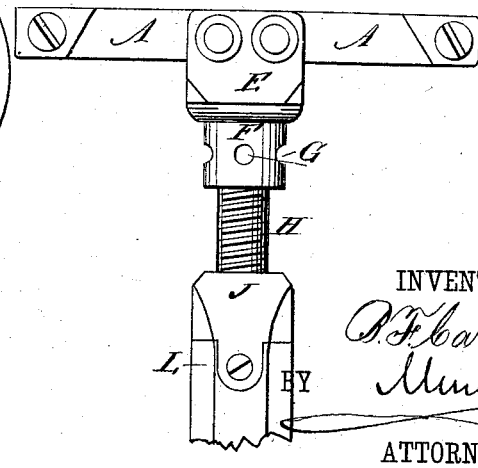

In the accompanying drawings, Figure 1 is a cross-sectional elevation of my improved tire-tightener, showing a side view of the felly-holding arms. Fig. 2 is a side elevation of the same. Fig. 3 is a front elevation of the swivel-head screw, capstan-head, and arms, showing the latter in a horizontal position.

The two arms A A are forked at the upper ends or provided with jaws B B, between which the fellies C of a wheel fit, which fellies are held to the jaws by binding-screws D D passing through these jaws B. The arms A A are pivoted in a forked swivel-head, E, loosely mounted on the head F, provided with apertures G G, for receiving a rod or lever, and rigidly mounted on the end of a screw, H, fitting into a threaded cap, J, and into an aperture, K, in a pedestal or block, L, which is chamfered at the lower ends, as shown at M, to fit in between the spokes N where the same enter the hub O.

The operation is as follows: The base L is placed upon the hub O, between the spokes N N, and the forked ends of the arms A A are placed against the fellies C C, which are secured thereto by the binding-screws D D. One arm A is attached to the fellies at each side of the joint P, so that these arms will be inclined toward each other, as shown. This inclination may be greater or less, accordingly as the pressure is to be exerted radially or circumferentially, for if the ends of the arms A are fastened to the fellies some distance from the joint the force will act more circumferentially than radially. By turning the head F by means of a rod or lever passed into one of the apertures G the screw H passes out of the block or pedestal L, and the upper ends of the arms A A will be separated, and as they are firmly united with the felly, the same will be expanded, and washers can be passed into the joint P to fill up the space between the ends of the fellies.

If the arms A A are placed in a horizontal position, as shown in Fig. 3, the within-described device can be used as a jack to lift wagons and other loads.

Having thus described my invention, I claim as new and desire to secure by Letters Patent—

In a tire-tightener, the combination, with the block L, having threaded cap J, and the screw H, having a head, F, with apertures G, of the head E, swiveled to the top of head F, and the arms A A, pivoted to head E, the whole adapted to be used as described.

BENJAMIN FRANKLIN CARLON.

Witnesses:
A. P. CARMICHAEL,
G. H. CARLON.